United States Patent

Hirata

[11] 4,191,449
[45] Mar. 4, 1980

[54] GUARD-RAIL REFLECTOR

[75] Inventor: Masuzo Hirata, Hirakata, Japan

[73] Assignee: Toyo Seikan Co., Ltd., Tokyo, Japan

[21] Appl. No.: 773,002

[22] Filed: Feb. 28, 1977

[51] Int. Cl.² .............................................. G02B 5/12
[52] U.S. Cl. ........................................ 350/97; 404/14
[58] Field of Search ............... 350/97, 103, 104, 106, 350/109; 256/13, 14, 42; 404/27, 1, 13.1, 14, 6, 9, 10, 11, 12, 13; D10/111

[56] References Cited

U.S. PATENT DOCUMENTS

| D. 241,924 | 10/1976 | Levy et al. | D10/111 |
| 1,847,025 | 2/1932 | Stockard | 256/13.1 |
| 2,047,436 | 7/1936 | Shepherd | 256/13.1 |
| 2,151,277 | 3/1939 | Meigs | 350/109 |
| 3,322,093 | 5/1967 | Goland et al. | 350/97 |
| 3,332,327 | 7/1967 | Heenan | 350/103 |
| 3,544,782 | 12/1970 | Hahn | 256/13 |
| 3,617,076 | 11/1971 | Attwood | 256/13.1 |
| 3,820,906 | 6/1974 | Kott | 404/10 |
| 3,907,404 | 9/1975 | McEwin | 350/97 |
| 3,951,517 | 4/1976 | Levy et al. | 350/99 |
| 3,954,324 | 5/1976 | Arnott et al. | 350/97 |
| 4,076,383 | 2/1978 | Heasley | 350/97 |

FOREIGN PATENT DOCUMENTS

| 501201 | 4/1954 | Canada | 350/97 |
| 1416026 | 9/1965 | France | |
| 46-7785 | 6/1967 | Japan | |
| 45-7502 | 4/1970 | Japan | |
| 45-19144 | 8/1970 | Japan | |

Primary Examiner—John K. Corbin
Assistant Examiner—B. W. de los Reyes
Attorney, Agent, or Firm—Charles E. Brown

[57] ABSTRACT

A guard-rail reflector having two reflecting planes positioned obliquely with each other, a bottom plane for connecting the reflecting planes together, one of the reflecting planes being inclined at 75°±15° with respect to the bottom plane, and the other of the reflecting planes being inclined at 65°±15° with respect to the bottom plane, whereby the reflecting planes effectively reflect light beams radiated from oncoming motor vehicles.

19 Claims, 15 Drawing Figures

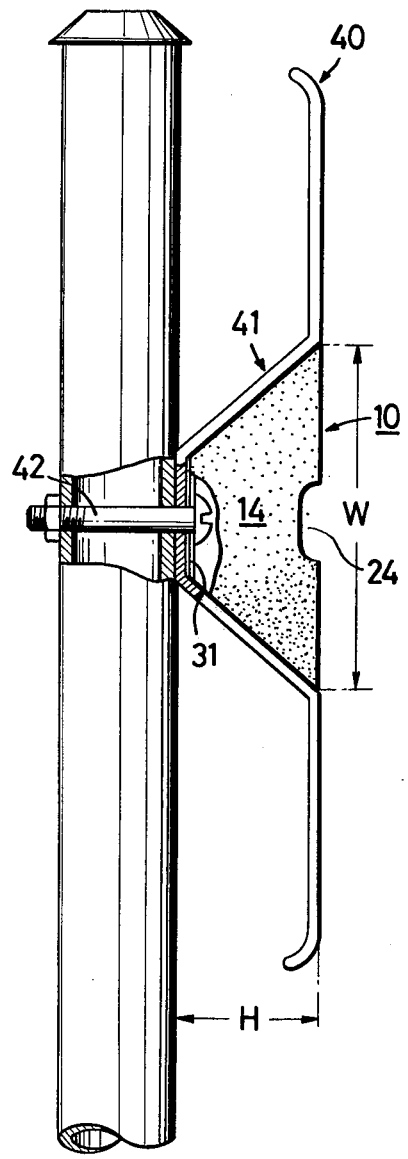
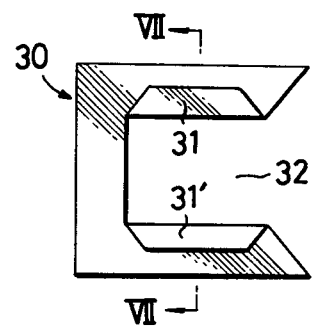
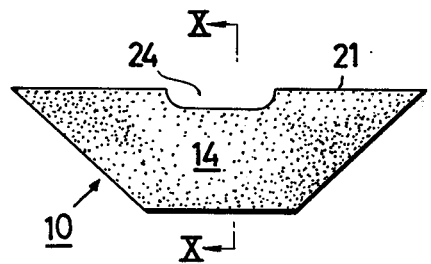
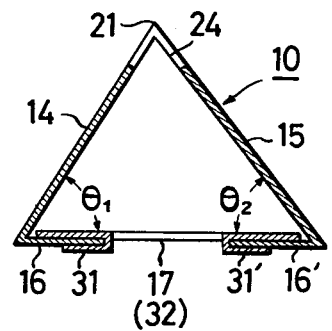

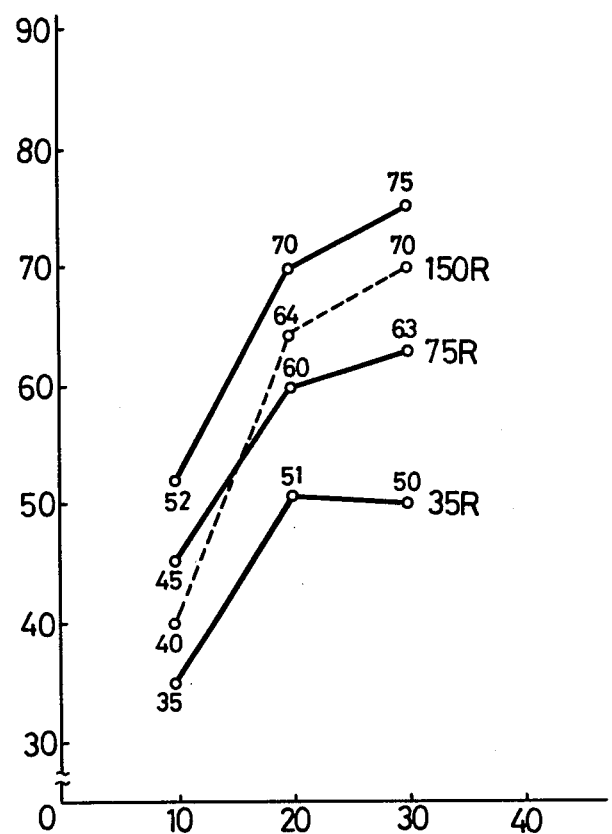
FIG ·15

GUARD-RAIL REFLECTOR

BACKGROUND OF THE INVENTION

The present invention relates to a guard-rail reflector and more particularly to an improved reflector mounted on a road-side guard rail or guard fence for ensuring the safety of travelling motor vehicles.

The purpose of a guard-rail reflector is to inform motor vehicle drivers of the general configuration of the road on which they are travelling and of the existence of the guard rail or guard fence so as to facilitate their safe driving.

A conventional guard-rail reflector is usually spherical or of a curved surface, and is fixed on a support mounted on the top of a pole of the guard rail. The conventional guard-rail reflector of this type can be seen from a distance somehow or other. However, because of its relatively small effective reflection area for a driver, it can sometimes hardly inform the driver of the existence of the guard rail sufficiently before the motor vehicle of the driver reaches too near to the guard rail to avoid a collision thereagainst. Accidents considered to be caused for this reason have been frequently occurred heretofore.

SUMMARY OF THE INVENTION

It is an object of the present invention to provide a guard-rail reflector which has a large effective reflection area and can be clearly seen from a distance. It is another object of the present invention to provide a guard-rail reflector which can well maintain its original shape against external pressures and can be hardly deformed when subjected to shocks.

It is still another object of the present invention to provide a guard-rail reflector which can be easily mounted on a guard rail.

According to the present invention, there is provided a guard-rail reflector having at least two reflecting planes positioned obliquely with each other, a bottom plane for connecting the reflecting planes together, one of the reflecting planes being inclined at an angle of $75° \pm 15°$ with respect to the bottom plane and the other of the reflecting planes being inclined at $65° \pm 15°$ with respect to the bottom plane.

BRIEF DESCRIPTION OF THE DRAWINGS

FIG. 6 is a plan view of a washer for use in the present invention;

FIG. 7 is a side sectional view thereof;

FIG. 8 is a longitudinal sectional view of a guard-rail reflector according to the present invention mounted on a guard rail;

FIG. 9 is a side view of a guard-rail reflector according to another embodiment of the present invention;

FIG. 10 is a sectional view taken along line X—X of FIG. 9;

FIG. 15 is still another graph showing the relationship between the "reflector's reflecting-plane angle" and the "illumination distance" of motor vehicle.

DETAILED DESCRIPTION OF THE INVENTION

Before describing the preferred embodiments of the present invention, the concept on which the present invention is based will be hereinafter described with reference to FIGS. 11 to 15.

When a motor vehicle is travelling with the light beams of its two headlights directed downward, on an ordinary road having a single lane 10 m wide at its one side, the maximum illumination distance or illumination range of the motor vehicle is about 30 m and therefore the motor vehicle cannot illuminate the range more than 30 m distant therefrom. In this case, the maximum illumination angle of the motor vehicle or its headlights is about 15° on either side with respect to the axis of the motor vehicle.

In due consideration of the above facts, various tests were conducted on a straight road and various curved roads (the radiuses of curvature of which were 35 m, 75 m and 150 m, respectively,) assuming that the maximum illumination distance and the maximum illumination angle were 30 m and 15°, respectively, to obtain the relationship between the reflecting plane angle of the reflector and the illumination distance of the motor vehicle (the distance between the reflector and the front center of the motor vehicle). The results are shown in Tables 1 to 4. More detailed description in this respect will appear later in this specification.

Figure 11:
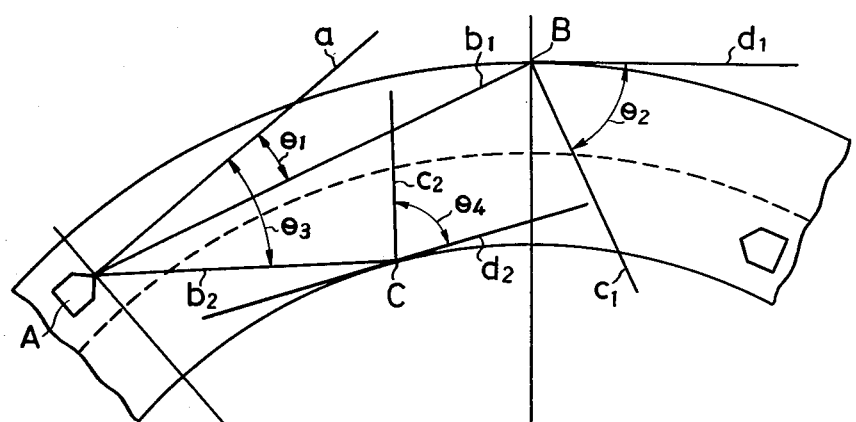
FIGS. 11 and 12 are schematical fragmentary plan views of curved and straight roads, respectively, for explaining the fundamental concept of the present invention.

Before describing the positional relationship between the headlight beams of the motor vehicle and the guard-rail reflector, various terms used in this specification will be defined as follows:

Reference is now made to FIG. 11 which is a fragmentary plan view of a curved road having two lanes, one of which a motor vehicle in question is travelling on and is hereinafter referred to as the forward lane and the other of which motor vehicles are moving on in the opposite direction and is hereinafter referred to as the opposite lane. Line "a" shows the direction of the center line of a motor vehicle A in question. Point B refers to a point on the outer side of the forward lane, which is positioned in front of the motor vehicle A and distant therefrom by a predetermined distance, for instance, 30 m. Line b1 is a line connecting the point B and the front center of the motor vehicle A. An angle $\theta 1$ formed between the line "a" and the line b1 is referred to as the "forward-lane illumination angle." Line d1 is a tangent to the curved road at the point B, and Line c1 is a line extended from the point B at right angles to the line b1. An angle $\theta 2$ formed between the tangent d1 and the line c1 is referred to as the "forward-lane reflector's reflecting-plane angle."

Figure 12:
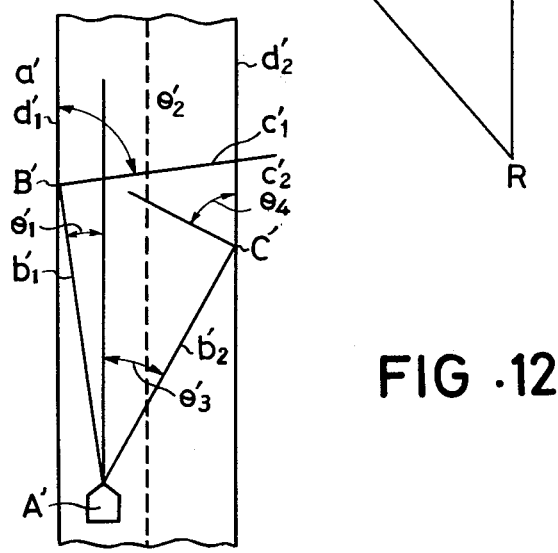

Reference is now made to FIG. 12 which is a fragmentary plan view of a straight road having two lanes similar to the curved road shown in FIG. 11. Point B' refers to a point on the outer side of the forward lane, which is positioned ahead of a motor vehicle A' in question and distant therefrom by a predetermined distance, for instance, 30 m. Line b'1 is a line connecting the point B' and the front center of the motor vehicle A'. Line a' shows the direction of the center line of the motor vehicle A'. An angle θ'1 formed between the line a' and the line b'1 is referred to as the "forward-lane illumination angle," as in the case of FIG. 11. Line d'1 is the outer side line of the straight road, and Line c'1 is a line extended from the point B' at right angles to the line b'1. An angle θ'2 formed between the line c'1 and the line d'1 is referred to as the "forward-lane reflector's reflecting-plane angle," as in the case of FIG. 11.

Reference is again made to FIG. 11. Point C is a point on the outer side line of the opposite lane, which is positioned ahead of the motor vehicle A and distant therefrom by a given distance. Line b2 is a line connecting the point C and the front center of the motor vehicle A. An angle θ3 formed between the line b2 the line "a" is referred to as the "opposite-lane illumination angle." Line d2 is a tangent to the curved road at the point C, and Line c2 is a line extended from the point C at right angles to the line b2. An angle θ4 formed between the tangent d2 and the line c2 is referred to as the "opposite-lane reflector's reflecting-plane angle."

Reference is again made to FIG. 12. Point C' is a point on the outer side line d'2 of the opposite lane, which is positioned ahead of the motor vehicle A' and distant therefrom by a given distance, for instance, 20 m. Line b'2 is a line connecting the point C' and the front center of the motor vehicle A'. An angle θ'3 formed between the line a' and the line b'2 is referred to as the "opposite-lane illumination angle," as in the case of FIG. 11. Line c'2 is a line extended from the point C' at right angles to the line b'2. An angle θ'4 formed between the line c'2 and the side line d'2 is referred to as the "opposite-lane reflector's reflecting-plane angle," as in the case of FIG. 11.

Angles θ1, θ3, θ'1 and θ'3 mentioned above are collectively referred to as the "illumination angle," which is formed between the line "a" or "a'" indicating the direction of the motor vehicle's center line and the line connecting the motor vehicle's front center with the position on the road side where the reflector is installed. Angles θ2, θ4, θ'2 and θ'4 mentioned above are collectively referred to as the "reflector's reflecting-plane angle," which is formed, at the position on the road side where the reflector is installed, between the tangent to the road and the line extended at right angles to the line connecting the reflector with the front center of the motor vehicle.

Now the results of the above-mentioned tests will be shown in detail hereinafter.

Table 1 gives the relationship between the illumination angle, the reflector's reflecting-plane angle and the illumination distance in the case of a straight road.

Table 2 shows the relationship between the forward-lane reflector's reflecting-plane angle, illumination angle and the illumination distance in the case of a curved road.

Table 3 shows the angle, illumination relationship between the forward-lane reflector's reflecting-plane angle and the illumination distance, obtained when the motor vehicle is travelling on the inside lane of a two-lane curved road.

Table 4 gives the relationship between the opposite-lane reflector's reflecting-plane angle, illumination angle and the illumination distance, obtained when the motor vehicle is travelling on the inside lane of a two-lane curved road.

Table 1

| | Forward lane | | Opposite lane | |
|---|---|---|---|---|
| Illumination distance | Reflecting-plane angle | Illumination angle | Reflecting-plane angle | Illumination angle |
| 10 m | 75° | 75° | 52° | 38° |
| 20 m | 83° | 7° | 70° | 20° |
| 30 m | 85° | 5° | 75° | 15° |

Table 2

| Radius of curvature of the road | Illumination distance | Reflecting-plane angle | Illumination angle |
|---|---|---|---|
| 35 mR | 10 m | 67° | 5° |
| | 20 m | 65° | 11° |
| | 30 m | 58° | 23° |
| 75 mR | 10 m | 71° | 12° |
| | 20 m | 73° | 3° |
| | 30 m | 71° | 9° |
| 150 mR | 10 m | 77° | 9° |
| | 20 m | 79° | 0 |
| | 30 m | 78° | 4° |

Table 3

| Radius of curvature of the road | Illumination distance | Reflecting-plane angle | Illumination angle |
|---|---|---|---|
| 35 mR | 10 m | 85° | 25° |
| | 20 m | — | — |
| 75 mR | 10 m | 78° | 18° |
| | 20 m | 87° | 17° |
| 150 mR | 10 m | 78° | 17° |
| | 20 m | 87° | 11° |

Table 4

| Radius of curvature of the road | Illumination distance | Reflecting-plane angle | Illumination angle |
|---|---|---|---|
| 35 mR | 10 m | 35° | 42° |
| | 20 m | 51° | 5° |
| | 30 m | 50° | 15° |
| 75 mR | 10 m | 45° | 45° |
| | 20 m | 60° | 30° |
| | 30 m | 63° | 5° |
| 150 mR | 10 m | 40° | 45° |
| | 20 m | 64° | 18° |
| | 30 m | 70° | 9° |

Then, another test was conducted. In this test, each reflector plate was made of usual material and was coated with a tin plate or a bright aluminum plate to form a reflecting plane. It was exposed to light beams incident thereon at various angles shown in Table 5 to obtain the relationship between the luminance of the reflector plate and the angles of incidence of the light beam. The angle of incidence in this test refers to that formed between the reflector plate and the light beam incident thereon. The results are shown in Table 5.

Table 5

| Angle of incidence | Luminance of bright aluminum plate | Luminance of tin plate |
| --- | --- | --- |
| 90 | 22 | 24 |
| 85 | 14 | 12 |
| 80 | 12 | 12 |
| 75 | 12 | 12 |
| 70 | 10 | 10 |
| 65 | 10 | 9 |

Figure 13:
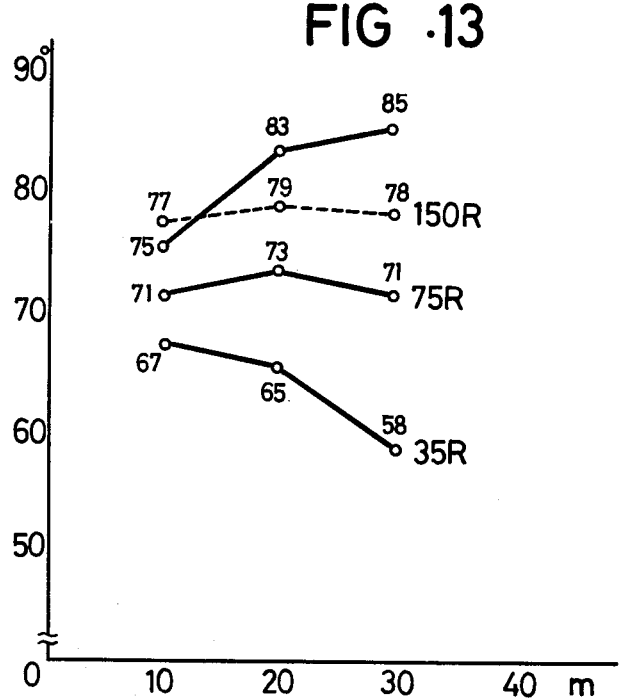
FIG. 13 is a graph showing the relationship between the "reflector's reflecting-plane angle" and the "illumination distance" of motor vehicle.
Figure 14:
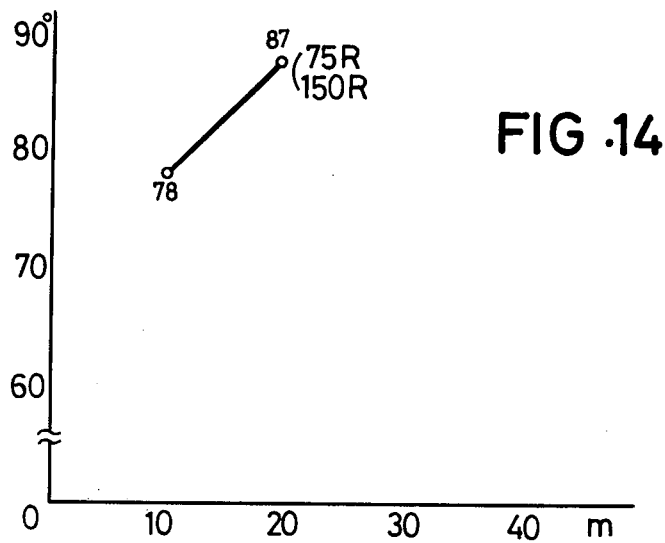
FIG. 14 is another graph showing the relationship between the "reflector's reflecting-plane angle" and the "illumination distance" of motor vehicle.

The majority of the roads on which motor vehicles travel are straight roads or curved roads having a radius of curvature of 35 to 150 mR. Thus, when a motor vehicle is travelling on the forward lane, the forward-lane reflector's reflecting-plane angle mostly falls within a range of 75°±15°, and the opposite-lane reflector's reflecting-plane angle within a range of 65°±15°. These facts are well understood from Tables 1 and 2, FIG. 13 showing a graph made by plotting the datas given in Tables 1 and 2, Table 3, FIG. 14 showing a graph made by plotting the data given in Table 3, Table 4, and FIG. 15 showing a graph made by plotting the data given in Table 4.

From the above-mentioned findings, it is known that the light radiated from the motor vehicle travelling on the forward lane can be mostly reflected by the reflector if the reflecting plane of the reflector is inclined at the above-mentioned forward-lane reflector's reflecting plane angle with respect to the tangent to the outer side line of the forward lane at the illuminated point, and that the light radiated from the motor vehicle travelling on the opposite lane can be best reflected by the reflector if the reflecting plane of the reflector is inclined at the above-mentioned opposite-lane reflector's reflecting plane angle with respect to the above-mentioned tangent. Thus the present invention was completed on the basis of the concept that, in order to satisfy the above two requirements simultaneously, it is necessary to provide a reflector having a reflecting plane which can best reflect both the light radiated from the motor vehicle travelling on the forward lane and that radiated from the motor vehicle travelling on the opposite lane at the same time.

As mentioned in the "Summary of the Invention", the guard-rail reflector according to the present invention has a first reflecting plane for reflecting the light radiated from the vehicle travelling on the forward lane and a second reflecting plane for reflecting the light radiated from the motor vehicle travelling on the opposite lane. The first and second reflecting planes are positioned obliquely with each other. These two reflecting planes may intersect with each other either directly or indirectly, and may be connected either by at least a supporting rod or a supporting plane. The supporting rod or supporting plane is preferably placed in parallel with the tangent to the side line of the road at the position where the guard-rail reflector of the present invention is installed. In addition, the first reflecting plane preferably intersects with the supporting plane or supporting rod at an angle of 75°±15°, and the second reflecting plane at an angle of 65°±15°. Furthermore, the angle formed between the first reflecting plane and the supporting plane or supporting rod is preferably greater than that formed between the second reflecting plane and the supporting plane or supporting rod. The first and second reflecting planes may form the planes of a triangular cross sectional tubular body, quadrangular cross sectional tubular body or the like, respectively.

DESCRIPTION OF THE PREFERRED EMBODIMENTS

Reference is now made to FIGS. 1 to 8, in which like reference characters designate like or corresponding parts throughout the views.

Figure 1:
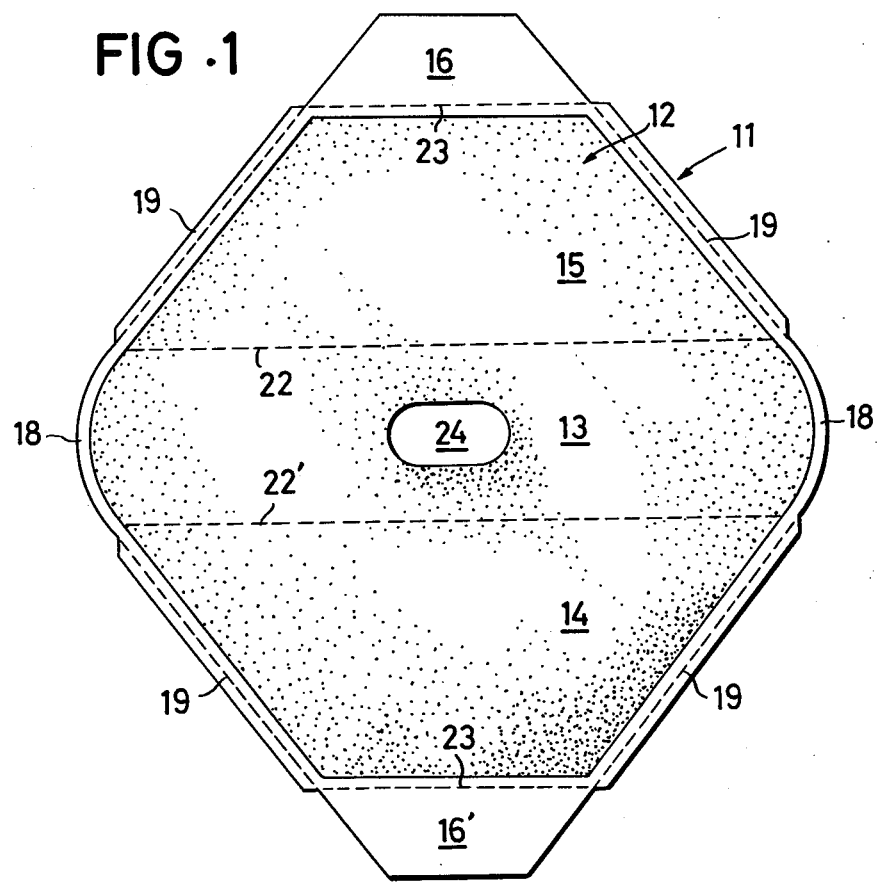
FIG. 1 is a development of a blank for a guard-rail reflector according to one embodiment of the present invention.
Figure 2:
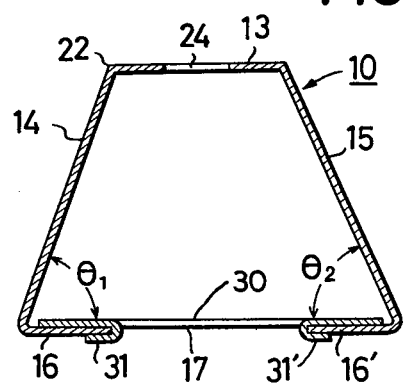
FIG. 2 is a longitudinal sectional view of a guard-rail reflector according to the present invention fabricated from the blank shown in FIG. 1.
Figure 3:
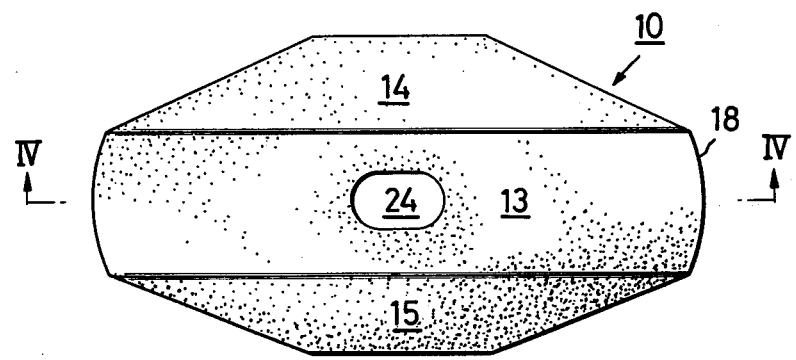
FIG. 3 is a front view thereof.
Figure 4:
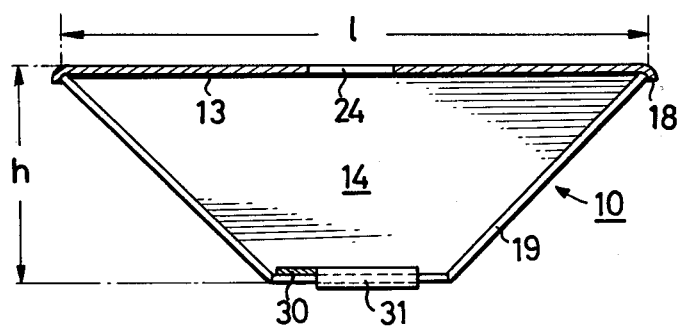
FIG. 4 is a sectional view taken along the line IV—IV of FIG. 3.

A plate 11 made of aluminum or other suitable metal coated with glass particles fixed thereon by a transparent resin adhesive to form a reflecting layer 12 is cut into a blank of the shape shown in FIG. 1. The blank is bent along fold lines 22 and 22' to form a first reflecting plane 14 and a second reflecting plane 15 with a central plane 13 therebetween. Simultaneously, the blank is bent along bottom fold lines 23 and 23' to form two bottom parts 16 and 16' or plane with an intermediate space 17 therebetween. The bottom parts 16 and 16' are made parallel with the central plane 13, as a matter of course. The angle $\theta 1$ formed between the first reflecting plane 14 and the bottom part 16 must fall within a range of 75°±15°, and the angle $\theta 2$ formed between the second reflecting plane and the bottom part 16' within a range of 65°±15°. In addition, the angle $\theta 1$ must be greater than the angle $\theta 2$. Then the upper and lower edges 18 and 18' of the central plane 13 are bent inward, and at the same time the oblique edges 19 and 19' of the first and second reflecting planes 14 and 15 are also bent inward. The sectional shape and side shape of the reflector 10 thus formed are both trapezoidal as shown in FIGS. 2, 3 and 4. The length l of the reflector or central plane 3 and the height h of the reflector (FIG. 4) are made so that they substantially correspond to the width W and depth H of the central recess 41 of a guard rail 40, respectively, as shown in FIG. 8. A through hole 24 may be provided on the central plane 13 of the reflector 10, if necessary.

Figure 5:
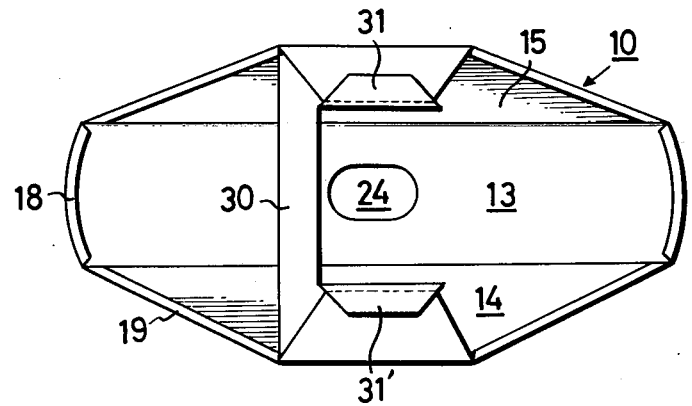
FIG. 5 is a bottom plan view of the guard-rail reflector shown in FIG. 2.

A U-shaped metal washer 30 having folded legs 31 and 31' shown in FIGS. 6 and 7 is fitted to the bottom parts 16 and 16' separated with the intermediate space 17 therebetween, by the aid of the folded legs 31 and 31' as shown in FIGS. 2 and 5.

The reflector 10 thus fabricated is then placed in the central recess 41 of the guard rail 40 as shown in FIG. 8 so that the head of a bolt 42 which is positioned at the bottom of the recess 41 and fixes the guard rail 40 to a pole may be inserted in a space 32 encircled with the U-shaped metal washer 30. Then a driver is inserted in the reflector 10 through the through hole 24 to rotate the above bolt 42 thereby fixing the guard-rail reflector 10 to the central recess 41 of the guard rail 40.

Next, another embodiment of the present invention will be described hereinafter. As shown in FIG. 9, the blank is bent along a central fold line 21 to form a reflector 10 triangular in section, as clearly seen in FIG. 10. The angle $\theta 1$ formed between the first reflecting plane 14 and the bottom part 16 and the angle formed between the second reflecting plane 15 and the bottom part 16' are preferably about 75° and 65°, respectively.

According to the present invention, as mentioned above, the reflector 10 is fabricated from a metal plate coated with a desired reflectinglayer 12 and has a first reflecting plane 10, a second reflecting plane 15 and bottom parts 16 and 16' at least. It may be made triangular in section as shown in FIG. 10 or trapezoidal in section as shown in FIG. 2. Moreover, it is formed so that the angle formed between the first reflecting plane 14 and the bottom part 16 and the angle formed between the second reflecting plane 15 and the bottom part 16' may fall within ranges of 75°±15° and 65°±15°, respectively, and so that the former angle may be greater than the latter. When installed, the reflector 10 is set vertically to the ground so that the bottom parts 16 and 16' of the bottom plane may become parallel with the front surface of the guard rail 40. Accordingly, when the reflector 10 is mounted on the guard rail 40, the first reflecting plane 14 is placed at about 75° with respect to the moving direction of a motor vehicle travelling on the forward lane, and the second reflecting plane 15 is placed at about 65° with respect to the moving direction of a motor vehicle travelling on the opposite lane. These angles were determined in consideration of the average visibility of the reflector under various travelling conditions as shown in the foregoing tables. Therefore, the reflector 10 of the present invention is very easy to see by most of drivers. In addition, the reflecting plane is not curved but flat, and therefore the entirety of the reflecting plane can be seen from the oncoming driver thereby further increasing the visibility of the reflector. Thus the reflector according to the present invention can be aware of by the driver sufficiently before the motor vehicle reaches too near to the guard rail to avoid a collision therewith at night, and thereby can increase the safety of the driver.

Furthermore, the reflector of the present invention is fabricated so that its length l and height h may become substantially equal to the width H and depth H of the central recess 41 of the guard rail 40, respectively, and so that it may be installed with the direction of its length l vertical to the ground and with its bottom parts 16 and 16' parallel with the front surface of the guard rail 40. Accordingly, the reflector 10 can be fitted in the central recess 41 of the guard rail tightly without looseness as shown in FIG. 8. Thus, the reflector 10 can well distribute the impact caused when a solid body impinges thereon, and therefore it is hardly subjected to deformation and damage.

Moreover, the guard-rail reflector of the present invention is fabricated so that the U-shaped washer 30 is fitted, by the aid of its fold legs 31 and 31', to the bottom parts 16 and 16' spaced apart with the intermediate space 17 therebetween. Accordingly, the portion of the reflector 10 pressed by a bolt head when the reflector 10 is bolted to the guard rail 40 consists of three layers, i.e., the bottom part 16 or 16', the washer 30 proper and its folded leg 31 or 31'. Even if the bolt is tightened very strongly to fix the reflector 10 to the guard rail 40, the bottom part 16 or 16' is not liable to deformation for the above reason. Thus the reflector 10 according to the present invention does not get loosened when once installed to the guard rail 40, even if subjected to a very great lateral pressure. Thus it can be placed in position at all times.

The guard-rail reflector 10 according to the present invention is fabricated so that the upper and lower edges 18 and 18' of the central plane 13 and the oblique edges 19 and 19' of the reflecting planes 14 and 15 are all folded inward. Accordingly, it can well maintain its original shape against external pressures, and therefore does not get deformed when subjected to shocks, thereby minimizing the possibility of deteriorating the visibility thereof.

In addition, the reflector 10 of the present invention is fabricated so that a suitable through-hole 24 is provided on the central plane 13 or the top 21 (in the case of the reflector triangular in section) and is positioned opposite to the intermediate space 17 between the bottom parts 16 and 16', and therefore it can be easily fixed to the guard rail 40 through the bottom parts 16 and 16' of the bottom plane.

Obviously, numerous modifications and variations of the present invention are possible in light of the above teachings. It is therefore to be understood that within the scope of the appended claims, the invention may be practiced otherwise than as specifically described herein.

I claim:

1. A new article of manufacture comprising a guard-rail reflector including a mounting plane and at least two reflecting planes, said mounting plane having a mounting surface, said reflecting planes extending from opposite edges of said mounting plane at acute angles thereto and in converging relation away from said mounting surface, said acute angles being intentionally different.

2. The guard-rail reflector as set forth in claim 1, wherein one of said reflecting planes is inclined at an angle of 75°±15° with respect to said mounting plane and the other of said reflecting planes is inclined at an angle of 65°±15° with respect to said mounting plane.

3. The guard-rail reflector as set forth in claim 2, wherein there is a connecting plane between said reflecting planes remote from and generally parallel to said mounting plane, and said reflector is of a quadrangular prism trapezoidal shape in section.

4. The guard-rail reflector of claim 1 wherein said reflecting planes include one reflecting plane adapted to be positioned adjacent and generally facing oncoming traffic, and said acute angle associated with said one reflecting plane being the larger of the two acute angles.

5. The guard-rail reflector of claim 1 wherein said mounting plane and said two reflecting planes are formed from a single continuous sheet to define a tubular body.

6. The guard-rail reflector of claim 1 including a front plane, said reflecting planes being connected into a one-piece irregular quadrangular tubular body trapezoidal in section by said mounting plane and said front plane 7. The guard-rail reflector as set forth in claim 6, one of said reflecting planes is inclined at 75°±15° with respect to said mounting plane and the other is inclined at 65°±15° with respect to said mounting plane.

8. The guard-rail reflector of claim 6 wherein said mounting plane is separated into two parts with a space therebetween, a U-shaped washer holding said two parts therebetween, and said irregular quadrangular tubular body having said reflecting planes at the center thereof.

9. The guard-rail reflector as set forth in claim 8 in combination with a guard-rail fixed to a supporting pole by a bolt, said guard-rail having a longitudinal recess, wherein the length of the top plane of said quadrangular tubular body and the height of said quadrangular tubular body are substantially equal to the width and depth of the guard-rail recess, respectively, one of said reflecting planes is inclined at 75°±15° and the other of said reflecting planes is inclined at 65°±15° with respect to said mounting plane and said bolt extends through said mounting plane.

10. A new article of manufacture comprising a guard-rail reflector including a mounting plane and at least two reflecting planes, said mounting plane having a mounting surface, said reflecting planes extending from opposite edges of said mounting plane at acute angles thereto and in converging relation away from said mounting surface, said mounting plane being separated into two parts having a space therebetween, and there being a washer positioned between said mounting plane two parts holding said two parts together.

11. The guard-rail reflector of claim 10 wherein said washer has a central fastener receiving space generally aligned with the space between said mounting plane parts, and a pair of reversely turned legs combining with adjacent portions of said washer to define sockets for receiving opposed edges of said mounting plane parts.

12. The guard-rail reflector of claim 11 wherein said mounting plane and said two reflecting planes are formed from a single continuous sheet to define a tubular body, and said tubular body has an access opening therein remote from said mounting plane and aligned with said fastener receiving space.

13. The combination of a guard-rail assembly and a reflector, said guard-rail assembly comprising upstanding parts, an upstanding guard-rail mounted on said parts and extending generally horizontally in accordance with the terrain, said guard-rail being shaped to have a longitudinally extending central recess, and said reflector being seated in said recess; the improvement residing in said recess having an inner base and being of a preset depth and height, and said reflector being formed of a single sheet of material, said sheet being folded to define a pair of overlapping bottom parts defining a mounting plane and at least two reflecting planes extending from opposite edges of said mounting planes at converging acute angles, said mounting plane being seated on said base and reflector planes being of dimensions normal to said mounting plane and parallel to said mounting plane corresponding generally to the depth and height of said recess.

14. The combination of claim 13 wherein a common fastener secures said reflector to said guard-rail and said guard-rail to one of said posts.

15. The combination of claim 13 wherein said recess includes upper and lower walls diverging from said base, and said reflecting planes have like sloping remote edges.

16. The combination of claim 13 wherein said reflector is a tube triangular in cross section and having an upstanding longitudinal axis parallel to said mounting planes and said reflector planes.

17. The combination of claim 13 wherein said reflector is a tube quadrangular in cross section and having an upstanding longitudinal axis parallel to said mounting planes and said reflector planes.

18. The guard-rail reflector of claim 13 wherein said acute angles are intentionally different.

19. The guard-rail reflector as set forth in claim 18, one of said reflecting planes is inclined at 75°±15° with respect to said mounting plane and the other is inclined at 65°±15° with respect to said bottom plane.

* * * * *